US008387036B2

(12) United States Patent
Rose (10) Patent No.: US 8,387,036 B2
(45) Date of Patent: Feb. 26, 2013

(54) METHOD AND SYSTEM FOR EXECUTION PROFILING USING LOOP COUNT VARIANCE

(75) Inventor: John Rose, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 486 days.

(21) Appl. No.: 12/694,883

(22) Filed: Jan. 27, 2010

(65) Prior Publication Data

US 2011/0185347 A1    Jul. 28, 2011

(51) Int. Cl.
*G06F 9/45* (2006.01)

(52) U.S. Cl. ........ 717/160; 717/150; 717/151; 717/140; 712/241

(58) Field of Classification Search .......... None
See application file for complete search history.

(56) References Cited

U.S. PATENT DOCUMENTS

| | | | | |
|---|---|---|---|---|
| 5,584,027 A * | 12/1996 | Smith | ............................ | 717/160 |
| 5,958,048 A * | 9/1999 | Babaian et al. | ............... | 712/241 |
| 6,118,940 A * | 9/2000 | Alexander et al. | ............. | 717/127 |
| 7,225,439 B2 * | 5/2007 | Garthwaite | .................... | 717/150 |
| 7,428,731 B2 * | 9/2008 | Wu et al. | ......................... | 717/158 |
| 2003/0097652 A1 * | 5/2003 | Roediger et al. | .............. | 717/160 |
| 2005/0251790 A1 * | 11/2005 | Hundt | ........................... | 717/130 |
| 2007/0113059 A1 * | 5/2007 | Tran | .............................. | 712/241 |
| 2008/0005332 A1 * | 1/2008 | Pande et al. | ................... | 709/226 |
| 2008/0168433 A1 * | 7/2008 | Arnold et al. | .................. | 717/158 |
| 2009/0276766 A1 * | 11/2009 | Song et al. | .................... | 717/159 |
| 2009/0307472 A1 * | 12/2009 | Essick IV, et al. | ............. | 712/241 |
| 2010/0287534 A1 * | 11/2010 | Vangala et al. | ............... | 717/124 |

* cited by examiner

*Primary Examiner* — Chameli C. Das
*Assistant Examiner* — V Miller
(74) *Attorney, Agent, or Firm* — Osha Liang LLP (57) ABSTRACT

A method for executing a computer program involving obtaining a statement of the source code, where the statement comprises a method call, and where the source code is composed in a statically-typed programming language. The method also involves, upon entry into a loop included in the computer program: incrementing an entry counter by one; and, for each iteration of the loop, incrementing an iteration counter by one, incrementing a local counter by one to obtain an incremented value of the local counter, incrementing a summation variable by the incremented value of the local counter, and executing the iteration of the loop.

17 Claims, 6 Drawing Sheets

METHOD AND SYSTEM FOR EXECUTION PROFILING USING LOOP COUNT VARIANCE

BACKGROUND

In computer programs, a loop is a sequence of program statements which is specified once but which may be executed multiple times in succession. A first type of loop is a count-controlled loop, meaning a loop that is repeated for a specified number of times. One example of a count-controlled loop is a For-Next loop.

A second type of loop is a condition-controlled loop, meaning a loop that is repeated until some condition changes. An example of a condition-controlled loop is a Do-While loop. A third type of loop is a collection-controlled loop, meaning a loop that is repeated for all elements of an array or all members of a set. An example of a collection-controlled loop is a For Each loop.

SUMMARY

In general, the invention relates to a computer usable storage medium having computer readable program code embodied therein. The computer readable program code is adapted to, when executed by the processor, implement a method for executing a computer program. The method involves obtaining a statement of the source code, where the statement comprises a method call, and where the source code is composed in a statically-typed programming language. The method also involves, upon entry into a loop included in the computer program: incrementing an entry counter by one; and, for each iteration of the loop, incrementing an iteration counter by one, incrementing a local counter by one to obtain an incremented value of the local counter, incrementing a summation variable by the incremented value of the local counter, and executing the iteration of the loop.

In general, the invention relates to a computer usable storage medium having computer readable program code embodied therein. The computer readable program code is adapted to, when executed by the processor, implement a method for executing a computer program. The method involves, upon entry into a loop included in the computer program: incrementing an entry counter by one; setting a local counter to zero; and, for each iteration of the loop: incrementing an iteration counter by one, incrementing the local counter by one to obtain an incremented value of the local counter, incrementing a summation variable by the incremented value of the local counter, executing the iteration of the loop, storing the entry counter, the iteration counter, and the summation variable in a execution profile associated with the loop, and compiling an optimized version of the loop using the execution profile.

In general, in one aspect, the invention relates to a system comprising a processor, a physical memory; and a computer usable storage medium having computer readable program code embodied therein. The computer readable program code is adapted to, when executed by the processor, implement a method for executing a computer program. The method involves obtaining a statement of the source code, where the statement comprises a method call, and where the source code is composed in a statically-typed programming language. The method also involves, upon entry into a loop included in the computer program: incrementing an entry counter by one; and, for each iteration of the loop, incrementing an iteration counter by one, incrementing a local counter by one to obtain an incremented value of the local counter, incrementing a summation variable by the incremented value of the local counter, and executing the iteration of the loop.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for loop optimization using execution profiles. In one or more embodiments of the invention, statistics describing past executions of a loop may be stored in a execution profile. Specifically, in one or more embodiments, the statistics stored in the execution profile may include an average number of iterations through the loop body per entry into the loop, and a variance in the number of iterations through the loop body per entry into the loop. Subsequently, in one or more embodiments of the invention, the execution profile may be used to compile an optimized loop, meaning a compiled version of the loop that is optimized (i.e., adapted for fast and/or efficient execution) for the expected program execution.

Figure 1A:
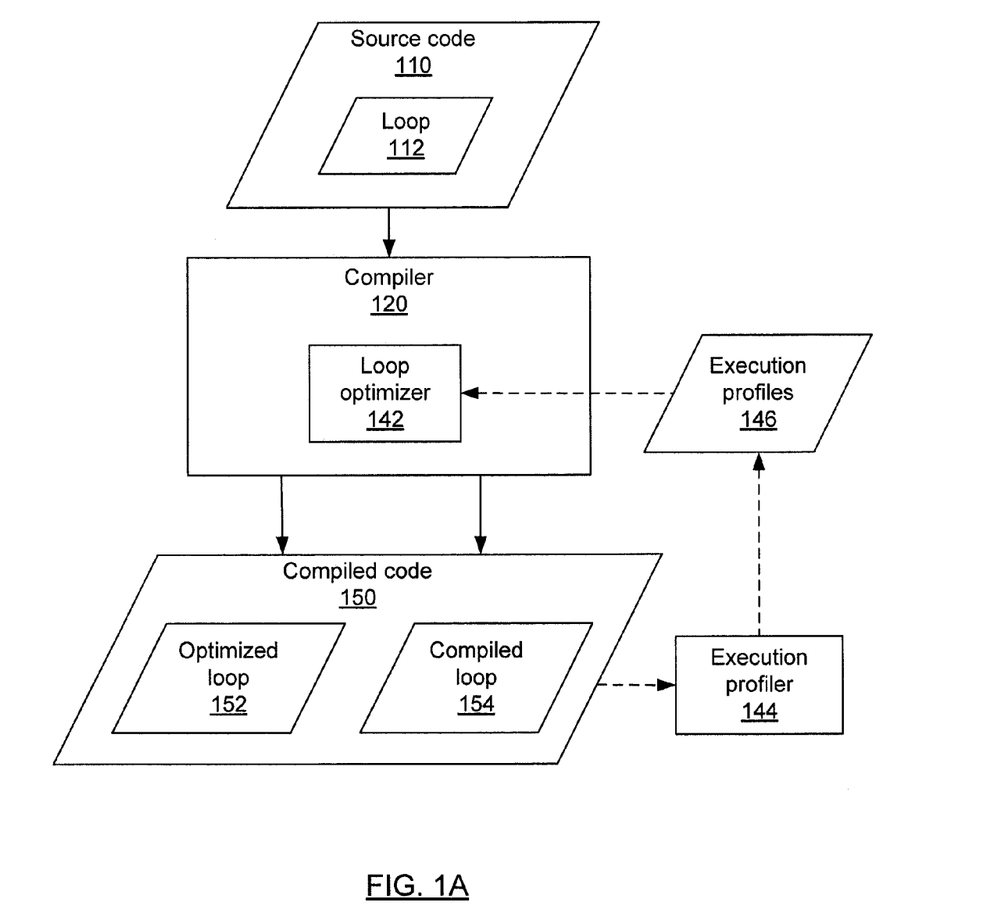
FIGS. 1A-1B show diagrams of software environments for optimizing execution of a loop, in accordance with one or more embodiments of the invention.

FIG. 1A shows a diagram of a software environment for optimizing execution of a loop (112), in accordance with one or more embodiments of the invention. Specifically, the loop (112) is set of program statements included in source code (100). An example structure of the loop (112) is described below with reference to FIG. 2. The source code (100) may be a program composed in a human-readable computer programming language (e.g., Java™, C, etc.). A person of skill in the art will appreciate that the loop (112) is exemplary, and may represent multiple different loops included in the source code (100).

Figure 2:
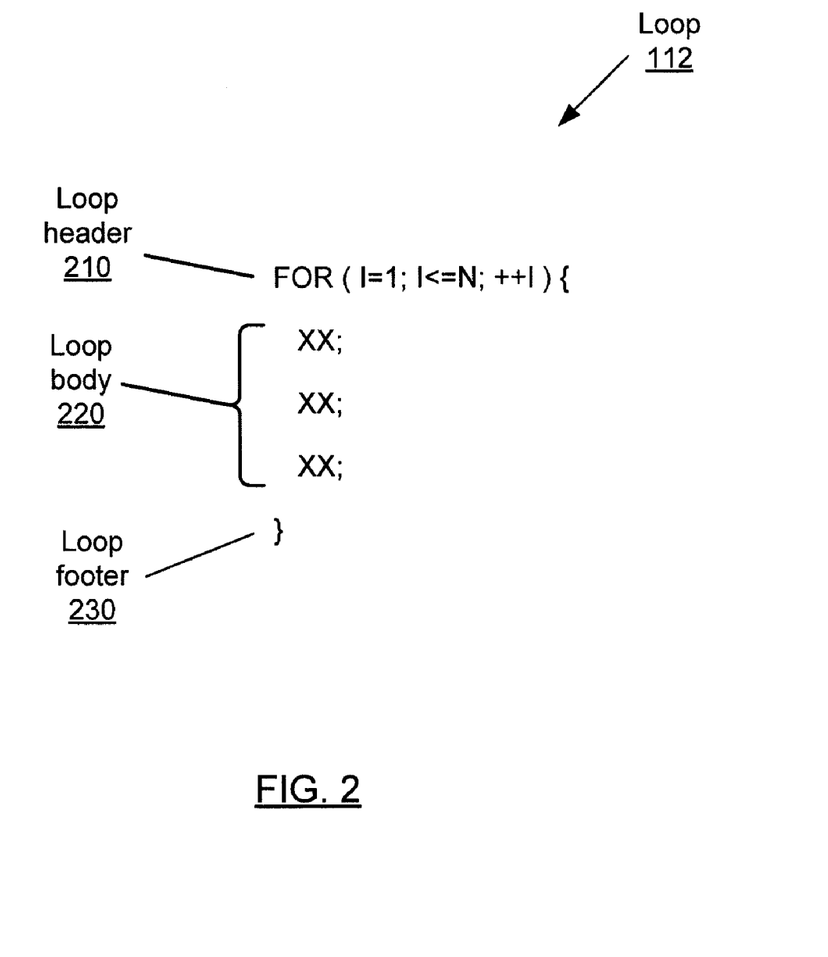
FIG. 2 shows a diagram of an exemplary structure of a loop, in accordance with one or more embodiments of the invention.

FIG. 2 shows a diagram of an exemplary structure of the loop (112), in accordance with one or more embodiments of the invention. As shown in FIG. 2, the loop (112) may includes a loop header (210), a loop body (220), and a loop footer (230). In one or more embodiments, the loop body (220) is a set of program statements which are repeated for multiple iterations in succession (i.e., "looped") during execution of the loop (112). Further, the loop header (210) may be one or more program statements which precede the loop body. Furthermore, the loop footer (230) may be one or more program statements which follow the loop body. Note that, in the example illustrated in FIG. 2, the loop header (210) includes instructions specifying that the loop body (220) is to be repeated for N iterations. Note also that the loop header (210) and the loop footer (230), unlike the loop body (220), are not looped. Rather, the loop header (210) is only executed when the loop (112) is entered (i.e., when the loop (112) is initially encountered during execution of the source code (100)). Similarly, the loop footer (230) may only be executed when the loop (112) is exited.

Referring again to FIG. 1A, the source code (100) may be compiled by a compiler (120), thereby producing compiled code (150) (i.e., instructions composed in the native language of an executing machine). Specifically, in one or more embodiments, the compiler (120) may selectively compile the loop (112) into either a compiled loop (154) or an optimized loop (152). For example, the compiler (120) may initially compile the loop (112) into the compiled loop (154). Subsequently (e.g., the next instance that the loop (112) is compiled), the compiler (120) may compile the loop (112) into an optimized loop (152).

In one or more embodiments, the compiler (120) may be configured to compile the compiled code (150) ahead of run time (i.e., before program execution). Optionally, the compiler (120) may be configured to compile the compiled code (150) at run time (i.e., the compiler (120) may be a dynamic compiler or just-in-time compiler). The compiled code (150) may be interpreted by a virtual machine interpreter, or can be executed directly by hardware (not shown).

In one or more embodiments, the compiled loop (154) is compiled according to general rules of the compiler (120), and is not optimized for the expected execution of the complied code (150). In contrast, in one or more embodiments, the optimized loop (152) is optimized (i.e., adapted for fast and/or efficient execution) for the expected program execution. Specifically, the compiler (120) may include a loop optimizer (142) configured to analyze statistics to determine the expected program execution, meaning the manner in which the optimized loop (152) is expected to be executed during execution of the compiled code (150). Further, the compiler (120) may use the loop optimizer (142) to compile the optimized loop (152) in a manner that is optimized for the expected program execution.

In one or more embodiments, the statistics describing loops (112) may be stored in execution profiles (146), with a different execution profile (146) being associated with each loop (112). As shown in FIG. 1A, the execution profiles (146) may be generated by a execution profiler (144). Specifically, the execution profiler (144) may analyze any executions of compiled code (150) associated with a given loop (112) (i.e., executions of compiled loops (154) and/or optimized loops (152) associated with the given loop (112)), and may then calculate statistics describing those executions. Further, the execution profiler (144) may store these statistics in a execution profile (146) associated with the loop (112). In one or more embodiments, each execution profile (146) may include a unique identifier identifying a particular loop (112). Optionally, the execution profile (146) may be linked to the compiled loop (154) and/or the optimized loop (152) associated with the particular loop (112). Note that, although the execution profiler (144) is illustrated as a stand-alone software element, the functionality of the execution profiler (144) may be implemented in any manner. For example, the execution profiler (144) may be included in another software component (e.g., compiler (120), an interpreter (not shown), etc.), or may be implemented as profiling instructions executing within interpreted or compiled code.

In one or more embodiments, the execution profiles (146) may include various statistics, including an average number of times that the loop (112) is entered during a given program execution, an average number of iterations through the loop body per each entry into the loop (112), a variance in the number of iterations through the loop body per each entry into the loop (112), and the like. A method for calculating the statistics included in the execution profiles (146) is described below with reference to FIG. 2, in accordance with one or more embodiments of the invention.

Figure 1B:
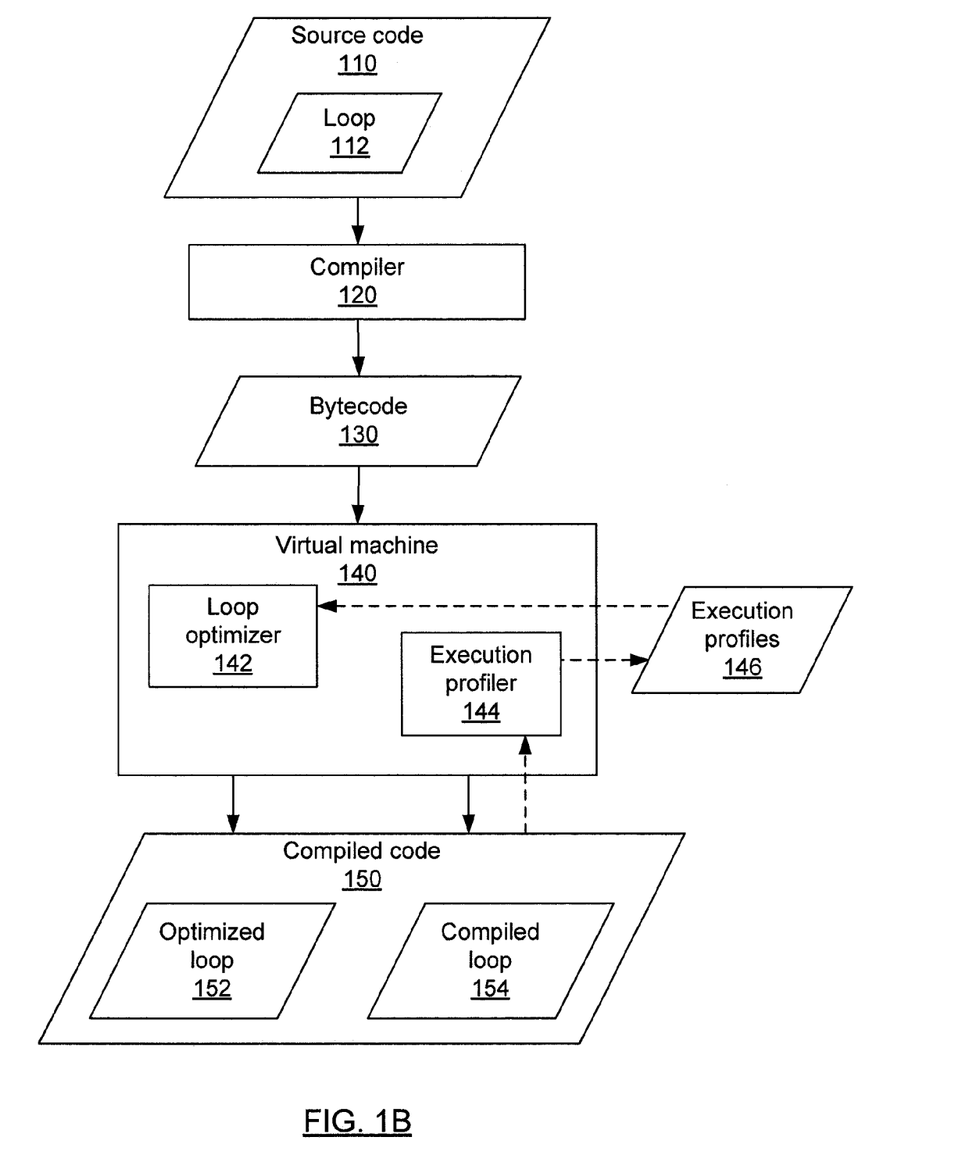

In one or more embodiments of the invention, optimized loops (152) may also be compiled by a virtual machine. One such an embodiment is shown in FIG. 1B. As shown in FIG. 1B, the source code (100) is compiled by the compiler (120) to produce bytecode (130). The bytecode (130) may be machine-independent instructions sets which are intermediate representations of the source code (e.g., Java™ bytecode). At runtime, the bytecode (130) may be compiled by a virtual machine (140), thereby producing compiled code (150).

In one or more embodiments, the virtual machine (140) may be an instruction set architecture-specific runtime environment designed to execute the bytecode (130). Examples of virtual machines include the Java Virtual Machine™ and the Microsoft .NET Common Language Runtime™. Java Virtual Machine™ is a registered trademark of Sun Microsystems, Inc., located in Santa Clara, Calif. Microsoft .NET Common Language Runtime™ is a registered trademark of Microsoft Corp., located in Redmond, Wash.

As shown in FIG. 1B, in one or more embodiments, the virtual machine (140) may selectively compile a portion of bytecode (130) corresponding to the loop (112) into either the compiled loop (154) or the optimized loop (152). The virtual machine (140) may include the loop optimizer (142) for use in compiling the optimized loop (152). Further, the virtual machine (140) may also may include the execution profiler (144) for use in generating execution profiles (146). Alternatively, the execution profiler (144) may be implemented as profiling instructions included in the compiled code (150), or by some other means (e.g., by patching or interrupting the code to interpose sampling logic).

A person of skill in the art will note that the embodiments shown in FIGS. 1A-1B are exemplary, and are not intended to limit the invention. For example, the execution profiler (144) may be implemented as a stand-alone application, may be included in other elements of the software environment (e.g., compiler (120), virtual machine (140) an interpreter, etc.), may be executed by the compiled code (150) itself, or by some combination of the above.

Figure 3:
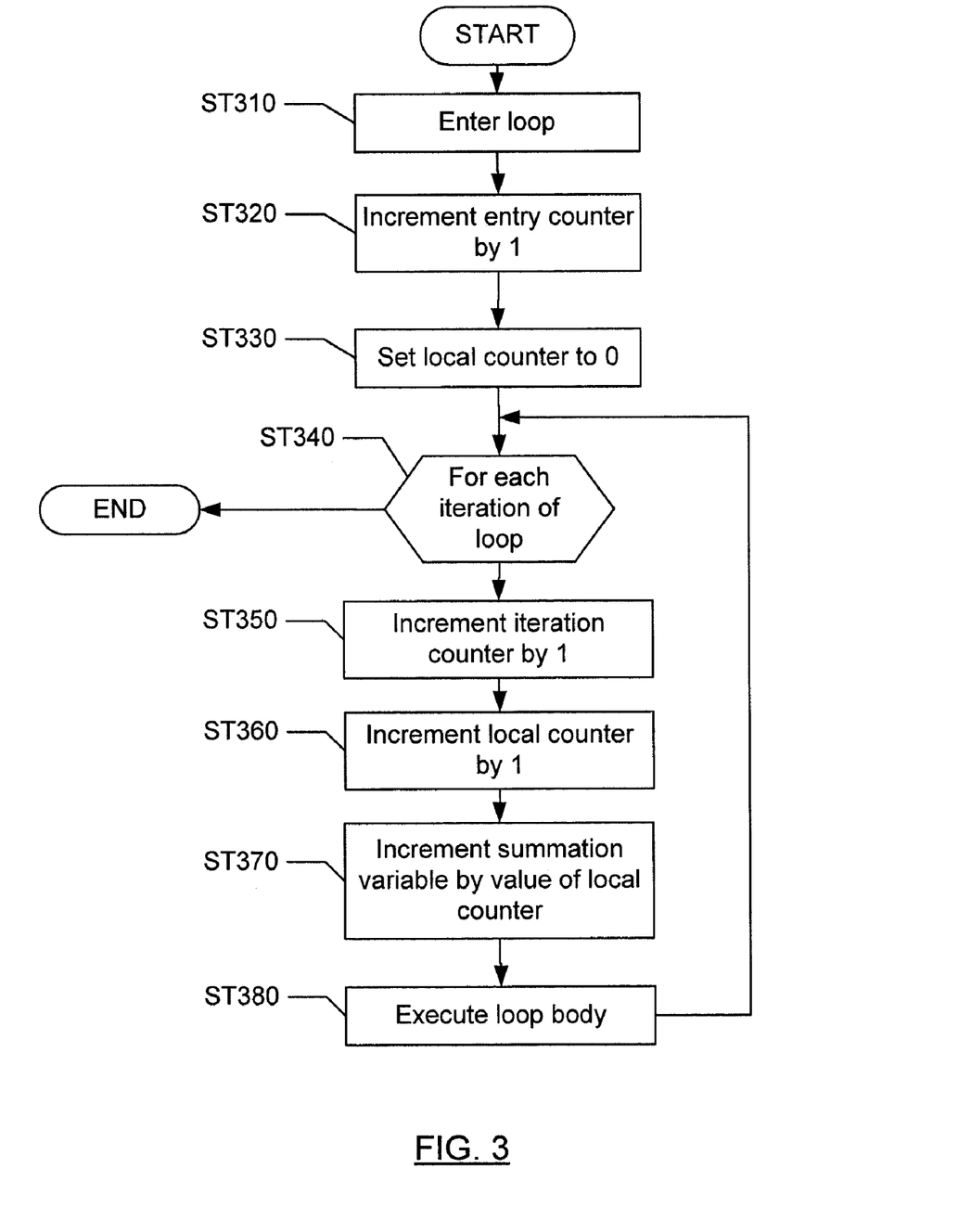
FIG. 3 shows a flowchart of a method for collecting an execution profile for a loop, in accordance with one or more embodiments of the invention.

FIG. 3 shows a flowchart of a method for collecting an execution profile for a loop, in accordance with one or more embodiments of the invention. In particular, the method shown in FIG. 3 may be performed by a execution profiler (e.g., execution profiler (144) shown in FIGS. 1A-1B). In one or more embodiments of the invention, one or more of the steps described below may be omitted, repeated, performed in parallel, and/or performed in a different order. Accordingly, the specific arrangement of steps shown in FIG. 3 should not be construed as limiting the scope of the invention.

At ST310, a loop may be entered during execution of a program. For example, referring to FIG. 1A, the loop (112)

may be entered during execution of a program. Further, in one or more embodiments, ST310 may occur when a loop header (e.g., loop header (210) shown in FIG. 2) of the current loop is executed. At ST320, an entry counter may be incremented by a value of one. As used herein, "entry counter" refers to a counter of the number of instances that a given loop (e.g., loop (112)) is entered during program execution.

At ST330, a local counter may be set to a value of zero. As used herein, "local counter" refers to a counter of the number of iterations that a loop body (e.g., loop body (220) shown in FIG. 2) is executed during a particular entry in to the current loop. In other words, the local counter for a given loop is set to zero each time that the loop is entered, thus indicating that no iterations of the loop body have been executed during the current entry to the loop.

At ST340, a method loop (defined by ST350, ST360, ST370, and ST380) is entered to process each iteration of the loop. At ST350, an iteration counter may be incremented by a value of one. As used herein, "iteration counter" refers to a counter of the number of iterations that the loop body has been executed globally (i.e., during the current entry into the current loop, as well as during past entries into the current loop). At ST360, the local counter is incremented by a value of one. In other words, the local counter may be incremented to indicate that the loop body has been executed one additional time.

At ST370, a summation variable may be incremented by the value of the local counter. As used herein, "summation variable" refers to a global variable storing the sum of the values of the local counter during each iteration of the loop body. The summation variable is described further below with reference to Table 1. At ST380, the loop body (e.g., loop body (220)) is executed. After ST380, the processing of the current iteration of the loop is complete, and the flowchart returns to ST340 to begin processing another iteration of the loop (if any). Once all iterations of the loop have been processed, the process terminates.

In one or more embodiments, the entry counter, the iteration counter, and/or the summation variable may be stored in a execution profile associated with the current loop (e.g., execution profile (146) shown in FIG. 1A). Optionally, the execution profile may be limited to a defined scope of program execution (e.g., to any executions of a particular program or set of programs, to executions occurring within a given date range or date ranges, to executions requested by a user or set of users, etc.).

Figure 4:
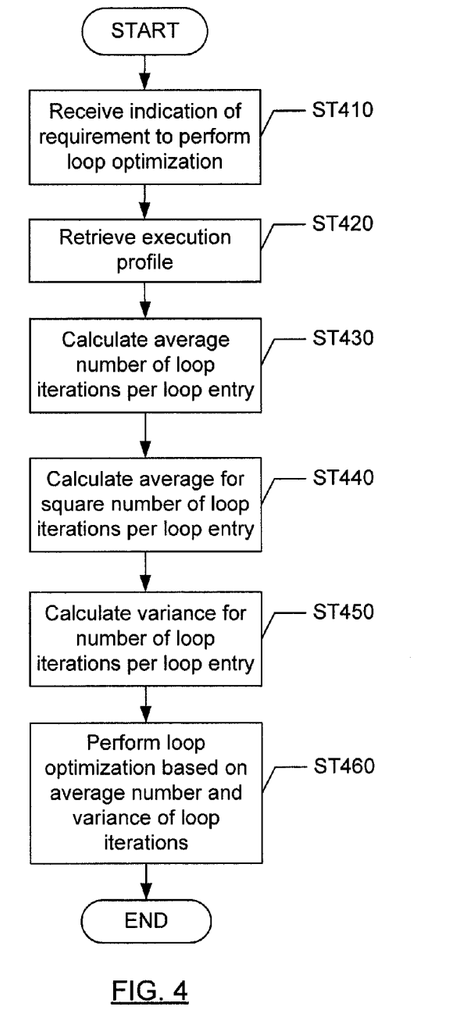
FIG. 4 shows a flowchart of a method for optimizing execution of a loop using a execution profile, in accordance with one or more embodiments of the invention.

In one or more embodiments, the execution profile created using the method shown in FIG. 3 may be used for optimizing compiled versions of the same loop. FIG. 4 shows a flowchart of a method for optimizing execution of a loop using a execution profile, in accordance with one or more embodiments of the invention. In particular, the method shown in FIG. 4 may be performed by a loop optimizer (e.g., loop optimizer (142) shown in FIGS. 1A-1B). In one or more embodiments of the invention, one or more of the steps described below may be omitted, repeated, performed in parallel, and/or performed in a different order. Accordingly, the specific arrangement of steps shown in FIG. 4 should not be construed as limiting the scope of the invention.

At ST410, an indication of a requirement to perform a loop optimization may be received. For example, a user may issue a command to a compiler (e.g., compiler (120) shown in FIG. 1A) so as to compile a loop included in source code (e.g., loop (112) included in source code (110), as shown in FIG. 1A) in an optimized manner (i.e., optimized for the expected program execution).

At ST 420, a execution profile for the current loop (e.g., execution profile (146) shown in FIG. 1A) may be retrieved. In one or more embodiments, the execution profile may be retrieved by matching the execution profile to a unique identifier of the current loop. Specifically, the unique identifier may identify a particular loop in source code and/or in bytecode (e.g., source code (110) and bytecode (130) shown in FIG. 1B). Further, the unique identifier may be, e.g., an alphanumeric string, an index number, or a hash code. The execution profile may be stored in any place normally used for data storage, including memory, a disk, a network server, and the like.

At ST 430, an average number of loop iterations per entry into the loop (N) may be calculated. In one or more embodiments, the loop optimizer may calculate N by dividing the global number of iterations of the loop (e.g., the iteration counter stored in the execution profile) by the global number of entries into the loop (e.g., the entry counter stored in the execution profile). The calculation of N may be described by the following formula:

$$N=(\text{iteration counter})/(\text{entry counter})$$

At ST440, an average of the squared number of loop iterations per entry into the loop (S) may be calculated. In one or more embodiments, the loop optimizer may calculate S by multiplying the sum of the values of the local counter during each iteration of the loop body (e.g., the summation variable stored in the execution profile) by two, subtracting the global number of iterations of the loop (e.g., the iteration counter stored in the execution profile), and then dividing the result by the global number of entries into the loop (e.g., the entry counter stored in the execution profile). The calculation of S may be described by the following formula:

$$S=((2*(\text{summation variable}))-(\text{iteration counter}))/(\text{entry counter})$$

At ST450, a variance for the number of loop iterations per entry into the loop (V) may be approximated. In one or more embodiments, the loop optimizer may approximate V by subtracting the square of N (i.e., the average number of loop iterations per entry into the loop) from S (i.e., the average of the square number of loop iterations per entry into the loop). The approximation of V may be described by the following formula:

$$V=S-N^2$$

At ST460, an optimization of the current loop may be performed based on N and/or V. In one or more embodiments, such optimizations may include compiling a generalized version of the loop (i.e., compiled code suitable for a wide range of values of N and/or V) or a specialized version of the loop (i.e., compiled code suitable for a narrow range of values of N and/or V). Further, the loop optimizer may select one or more loop optimization techniques depending on whether N is above or below predefined thresholds, whether V is above or below predefined thresholds, or some combination of the levels of N and V. Examples of loop optimization techniques which may be performed by the loop optimizer include loop peeling, loop fusion, loop unrolling, vectorization, and the like. After ST460, the process terminates.

Table 1 shows an example of execution profile data, in accordance with one or more embodiments of the invention. Specifically, the example of Table 1 is intended to illustrate the data fields of a execution profile, as described above with reference to FIG. 3.

TABLE 1

| Execution profile Data | | | |
|---|---|---|---|
| Entry Cntr. | Iter. Per Entry | Iter. Cntr. | Summ. Var. |
| 0 | — | — | — |
| 1 | 4 | 4 | 10 |
| 2 | 3 | 7 | 16 |
| 3 | 5 | 12 | 31 |
| 4 | 4 | 16 | 41 |
| 5 | 4 | 20 | 51 |

Table 1 includes values for three data fields included in a execution profile, namely the entry counter, the iteration counter, and the summation variable (labeled "Entry Cntr.," "Iter. Cntr.," and "Summ. Var.," respectively). In addition, Table 1 includes a data field for the number of loop iterations executed per loop entry (labeled "Iter. Per Entry"). The rows of Table 1 correspond to the values of the data fields before any entry into the loop, as well as to the first five entries into the loop. Thus, the first row of Table 1 indicates that, before the first entry into the loop, the data fields in the execution profile associated with the current loop are null.

As shown in Table 1, the first entry into the loop (described in the second row of Table 1) resulted in four loop iterations. Accordingly, the iteration counter has a value of 4. Further, the summation variable is incremented by the value of the local counter during the four iterations (i.e., 0+1+2+3+4), and thus has a value of 10.

The second entry into the loop (described in the third row of Table 1) resulted in three loop iterations. Accordingly, the iteration counter has a value of 7 (i.e., 4+3). Further, the summation variable is incremented by the value of the local counter during the three iterations (i.e., 10+1+2+3), and thus has a value of 16.

The third entry into the loop (described in the fourth row of Table 1) resulted in five loop iterations. Accordingly, the iteration counter has a value of 12 (i.e., 7+5). Further, the summation variable is incremented by the value of the local counter during the five iterations (i.e., 16+1+2+3+4+5), and thus has a value of 31.

The fourth entry into the loop (described in the fifth row of Table 1) resulted in four loop iterations. Accordingly, the iteration counter has a value of 16 (i.e., 12+4). Further, the summation variable is incremented by the value of the local counter during the last four iterations (i.e., 31+1+2+3+4), and thus has a value of 41.

The fifth entry into the loop (described in the sixth row of Table 1) resulted in four loop iterations. Accordingly, the iteration counter has a value of 20 (i.e., 16+4). Further, the summation variable is incremented by the value of the local counter during the last four iterations (i.e., 41+1+2+3+4), and thus has a value of 51.

Continuing with the example described in Table 1, assume that, after the fifth entry into the loop, the execution profile is used to calculate statistics describing the expected execution of the loop. As described above with reference to ST430 of FIG. 4, the average number of loop iterations per entry into the loop (N) may be calculated by dividing the iteration counter by the entry counter. Thus, in this example, N is equal to 4 (i.e., 20/5).

Further, as described above with reference to ST440 of FIG. 4, the average of the squared number of loop iterations per entry into the loop (S) may be calculated by multiplying the summation variable by two, subtracting the iteration counter, and then dividing the result by the entry counter. Thus, in this example, S is equal to 16.4 (i.e., ((2*51)−20)/5).

Furthermore, as described above with reference to ST450 of FIG. 4, the variance for the number of loop iterations per entry into the loop (V) may be approximated by subtracting the square of N from S. Thus, in this example, V is approximately equal to 0.4 (i.e., $16.4-4^2$).

Continuing with this example, the loop optimizer (142) may determine that N is below a predefined threshold of 10 and that V is below a predefined threshold of 0.8. Accordingly, the loop optimizer (142) may determine that the current loop may be optimized by compiling the loop using an optimization technique which improves the speed of loop execution if the number of loop iterations per entry is less than 20, but which may decrease the speed of loop execution if the number of loop iterations per entry is greater than 50.

In another example (not shown in Table 1), assume that the current loop is determined to have a very small variance (e.g., V=0.001). In this example, the loop optimizer (142) may determine that the current loop is very likely to execute for N iterations (i.e., the average number of iterations per loop entry). Accordingly, the loop optimizer (142) may determine that the current loop may be optimized by using an optimization technique which improves the speed of loop execution if the number of loop iterations per entry is exactly equal to N, but which may suffer a performance penalty if the number of loop iterations per entry differs from N by one or more iterations.

Figure 5:
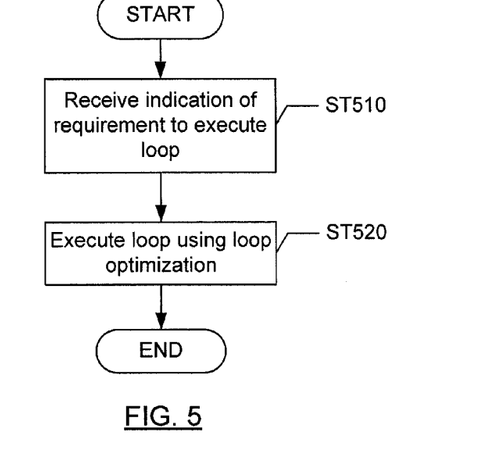
FIG. 5 shows a flowchart of a method for executing a loop using loop optimization, in accordance with one or more embodiments of the invention.

In one or more embodiments, the loop optimization may be used to execute the loop. FIG. 5 shows a flowchart of a method for executing a loop using a loop optimization, in accordance with one or more embodiments of the invention. In particular, the method shown in FIG. 5 may be performed using a loop optimized using the method shown in FIG. 4. In one or more embodiments of the invention, one or more of the steps described below may be omitted, repeated, performed in parallel, and/or performed in a different order. Accordingly, the specific arrangement of steps shown in FIG. 5 should not be construed as limiting the scope of the invention.

At ST510, an indication of a requirement to execute a loop may be received. For example, referring to FIG. 1A, the compiled loop (152) may be encountered during an execution of the compiled code (150). At ST520, the loop may be executed using the loop optimization. For example, the optimized loop (152) may be executed for a particular number of iterations.

In some instances, the number of loop iterations executed at ST520 may conform to the predicted loop execution (determined at ST410-ST450, as described above with reference to FIG. 4). Accordingly, in such instances, the optimized loop (152) may execute more quickly and/or efficiently than the compiled loop (154) could have been executed. In this manner, embodiments of the invention may result in improved speed and/or efficiency in executing program loops.

Figure 6:
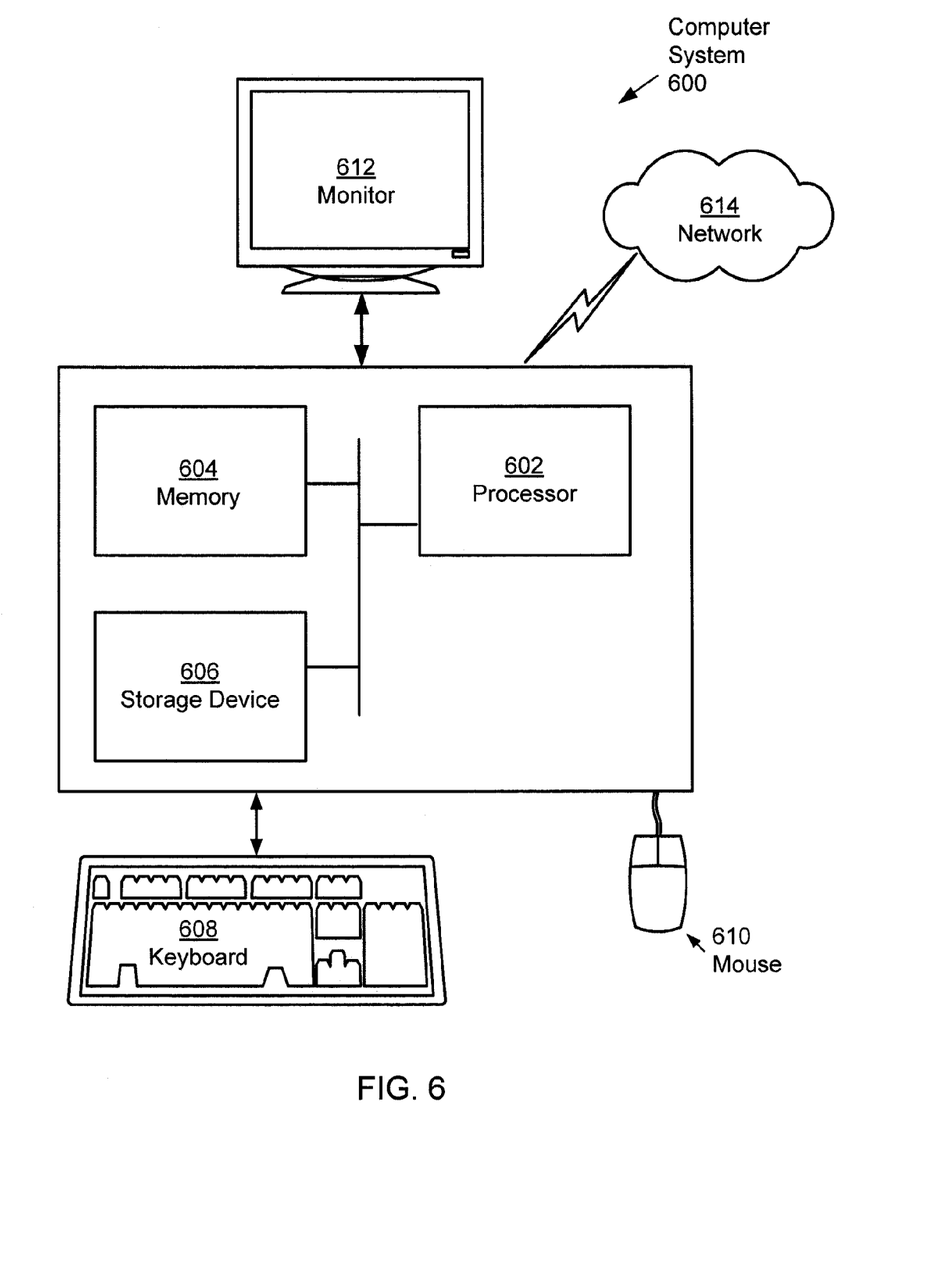
FIG. 6 shows a diagram of a computer system, in accordance with one or more embodiments of the invention.

Embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a network (614) (e.g., a local area network (LAN), a wide area network, etc.) via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code adapted to, when executed by a processor, implement a method for executing a computer program, the method comprising:
    upon entry into a loop included in the computer program:
        incrementing an entry counter by one;
    for each iteration of a plurality of iterations of the loop:
        incrementing an iteration counter by one;
        incrementing a local counter by one to obtain an incremented value of the local counter;
        increasing a value of a summation variable by the incremented value of the local counter; and
        executing the iteration of the loop; and
    calculating a variance for the number of iterations per entry into the loop using the entry counter, the value of the summation variable, and the iteration counter to obtain an execution profile for the loop.

2. The non-transitory computer readable storage medium of claim 1, further comprising, upon entry into the loop, setting the local counter to zero.

3. The non-transitory computer readable storage medium of claim 1, wherein the entry counter, the iteration counter, and the summation variable are stored in the execution profile associated with the loop.

4. The non-transitory computer readable storage medium of claim 1, wherein the loop is one of a plurality of loops included in the computer program.

5. The non-transitory computer readable storage medium of claim 4, wherein each of the plurality of loops is associated with a different execution profile.

6. The non-transitory computer readable storage medium of claim 1, further comprising using the entry counter and the iteration counter to calculate an average number of iterations per entry into the loop.

7. The non-transitory computer readable storage medium of claim 1, further comprising determining whether the variance is above a predefined threshold.

8. The non-transitory computer readable storage medium of claim 7, further comprising, upon determining that the variance is above a predefined threshold, compiling the loop into a generalized version of the loop.

9. The non-transitory computer readable storage medium of claim 7, further comprising, upon determining that the variance is not above a predefined threshold, compiling the loop into a specialized version of the loop.

10. A non-transitory computer readable storage medium having computer readable program code embodied therein, the computer readable program code adapted to, when executed by a processor, implement a method for executing a computer program, the method comprising:
    upon entry into a loop included in the computer program:
        incrementing an entry counter by one;
        setting a local counter to zero;
    for each iteration of the loop:
        incrementing an iteration counter by one;
        incrementing the local counter by one to obtain an incremented value of the local counter;
        increasing a value of a summation variable by the incremented value of the local counter;
        executing the iteration of the loop;
    calculating a variance for the number of iterations per entry into the loop using the entry counter, the value of the summation variable, and the iteration counter to obtain an execution profile for the loop; and
    compiling an optimized version of the loop using the execution profile.

11. The non-transitory computer readable storage medium of claim 10, wherein the loop is one of a plurality of loops included in the computer program.

12. The non-transitory computer readable storage medium of claim 11, wherein each of the plurality of loops is associated with a different execution profile.

13. The non-transitory computer readable storage medium of claim 10, wherein compiling the optimized version of the loop comprises using the entry counter and the iteration counter to calculate an average number of iterations per entry into the loop.

14. A system, comprising:
    a processor;
    a physical memory; and
    a computer usable storage medium having computer readable program code embodied therein, the computer readable program code adapted to, when executed by the processor, implement a method for executing a computer program, the method comprising:
        obtaining a statement of the source code, wherein the statement comprises a method call, and wherein the source code is composed in a statically-typed programming language;
        upon entry into a loop included in the computer program:
            incrementing an entry counter by one;
        for each iteration of the loop:
            incrementing an iteration counter by one;
            incrementing a local counter by one to obtain an incremented value of the local counter;
            increasing a value of a summation variable by the incremented value of the local counter; and
            executing the iteration of the loop; and
        calculating a variance for the number of iterations per entry into the loop using the entry counter, the value of the summation variable, and the iteration counter to obtain an execution profile for the loop.

15. The system of claim 14, the method further comprising, upon entry into the loop, setting the local counter to zero.

16. The system of claim 14, wherein the entry counter, the iteration counter, and the summation variable are stored in the execution profile associated with the loop.

17. The system of claim 14, the method further comprising using the entry counter and the iteration counter to calculate an average number of iterations per entry into the loop.

* * * * *